United States Patent
Wilson et al.

(10) Patent No.: US 7,058,008 B1
(45) Date of Patent: Jun. 6, 2006

(54) LINK CAPACITY ADJUSTMENT COMPONENT

(75) Inventors: James T Wilson, Comber (GB); Pierre Miller, Hull (CA)

(73) Assignee: Nortel Networks Limited, St. Laurent (CA)

(*) Notice: Subject to any disclaimer, the term of this patent is extended or adjusted under 35 U.S.C. 154(b) by 914 days.

(21) Appl. No.: 10/090,383

(22) Filed: Mar. 4, 2002

(51) Int. Cl.
*H04J 1/16* (2006.01)
*H04J 3/14* (2006.01)
*H04J 15/00* (2006.01)

(52) U.S. Cl. .................... 370/216; 370/242; 370/464

(58) Field of Classification Search ........ 370/216–228, 370/242–247, 464, 465
See application file for complete search history.

(56) References Cited

U.S. PATENT DOCUMENTS 5,321,688 A * 6/1994 Nakano et al. ............. 370/244
6,163,529 A * 12/2000 Nagel et al. ............... 370/244
6,304,549 B1 * 10/2001 Srinivasan et al. ........ 370/230

FOREIGN PATENT DOCUMENTS

WO  WO 95/08882  3/1995

OTHER PUBLICATIONS

Jones Nevin et al: "Proposed Text on Link Capacity Adjustment Scheme (LCAS) for SONET Virtually Concatenated SPEs to be Included in T1.105", Contribution to T1 Standard Project, Oct. 9, 2000.

* cited by examiner

*Primary Examiner*—Chi Pham
*Assistant Examiner*—Kerri Dyke
(74) *Attorney, Agent, or Firm*—Barnes & Thornburg LLP

(57) ABSTRACT

A component for adjusting the capacity of a network link between the component and another component is disclosed. The component receives a first data signal and transmits across forward channels of the network link a plurality of second data signals carrying the data of the first data signal and control information for a plurality of third data signals. The component further receives the plurality of third data signals across respective return channels, these third data signals carrying control information for the plurality of second data signals. The control information includes status information for less than a maximum number of the forward channels, and the status information is out of phase within each of the return channels in respect of the forward channels to which the status information relates. The component is responsive to this status information to adjust the capacity of the network link.

19 Claims, 10 Drawing Sheets

| Multi-Frame No | RTN Channel #1 | RTN Channel #2 |
|---|---|---|
| 1 | 0-7 | 128-135 |
| 2 | 8-15 | 136-143 |
| 3 | 16-23 | 144-151 |
| .... | .... | .... |
| 29 | 224-231 | 96-103 |
| 30 | 232-239 | 104-111 |
| 31 | 240-247 | 112-119 |
| 32 | 248-255 | 120-127 |

Figure 2 (Prior Art)

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| MST_MSB | MST_LSB | RS-ACK | RES | RES | RES | SQ | SQ | MFI-2_MSB | MFI-2_LSB | Crtl | GID | RES | RES | CRC-8_MSB | CRC-8_MSB |

- Columns 0–1: 34
- Columns 8–9: 32

| Multi-Frame No | RTN Channel #1 | RTN Channel #2 |
|---|---|---|
| 1 | 0-7 | 128-135 |
| 2 | 8-15 | 136-143 |
| 3 | 16-23 | 144-151 |
| ... | ... | ... |
| 29 | 224-231 | 96-103 |
| 30 | 232-239 | 104-111 |
| 31 | 240-247 | 112-119 |
| 32 | 248-255 | 120-127 |

Figure 8

| Mem #1 | Mem #2 | Mem #3 |
|---|---|---|
| 0-7 | 16-23 | 8-15 |
| 8-15 | 0-7 | 16-23 |
| 16-23 | 8-15 | 0-7 |
| 0-7 | 16-23 | 8-15 |
| 8-15 | 0-7 | 16-23 |
| 16-23 | 8-15 | 0-7 |

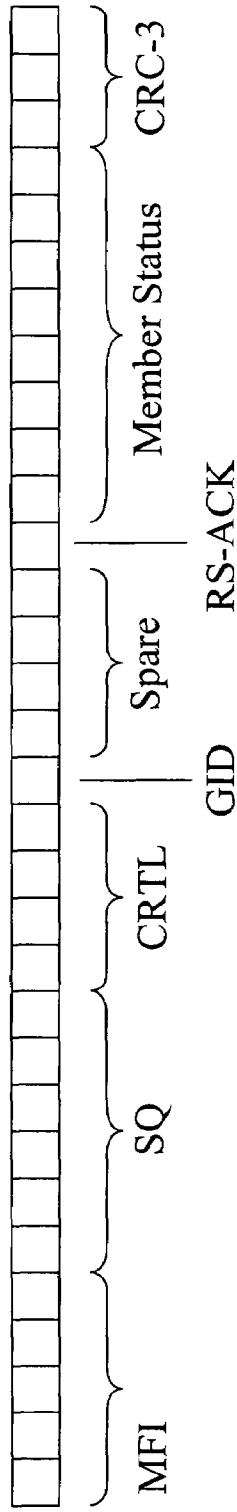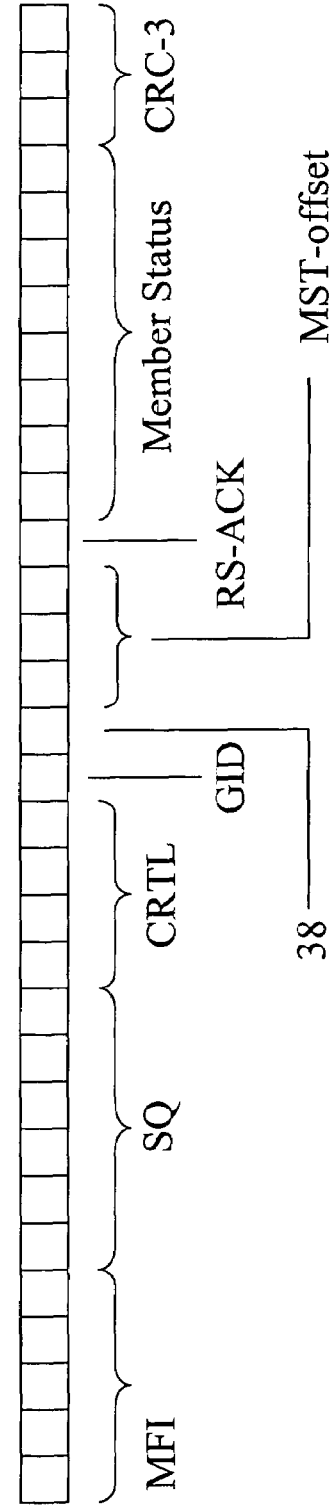

LINK CAPACITY ADJUSTMENT COMPONENT

FIELD OF THE INVENTION

The present invention relates to a component for adjusting the capacity of a network link, a method for adjusting the capacity of a network link and a computer program product which when executed on a networked device is operable to adjust the capacity of a network link.

BACKGROUND OF THE INVENTION

Virtual Concatenation is a technique standardised in ITU-T recommendations G.707 and G.783 for use in transport networks, for example, Synchronous Digital Hierarchy (SDH) the European counterpart of Synchronous Optical NETwork (SONET) and Optical Transport Network (OTN).

Referring to FIG. 1, an unprotected SONET/SDH virtual concatenation link 10 is employed to transmit a high bandwidth client signal 12 from a component 20 acting as a source across the link to a component 22 acting as a sink where the signal is re-assembled and transmitted as another high bandwidth client signal 14. The link 10 comprises a plurality of parallel unidirectional channels or members. It will be therefore be appreciated that traffic flowing from the component 22 to the component 20 needs to be transported on a separate link (not shown) comprising channels having their source at the component 22 and corresponding sinks at the component 20. Nonetheless, as explained later, it will be seen that control signals relating to traffic on one link may be returned on the other link and so the two links are not completely independent.

Each Virtual Concatenation link or Virtually Concatenated Group (VCG) has a maximum capacity of 256:64 channels. In SDH terminology a link is designated as: VC-n-256v where n=3,4 for High Order (HO); or VC-n-64v where n=11, 12, 2 for Low Order (LO). In, for example, a VC-4-7v link, an incoming client signal is divided into up to 7 channels. In High Order SONET terminology, link designations are of the form STS-n-Xv, where n=1,3c and Xmax is 256. In Low Order SONET terminology, link designations are of the form VT-n-Xv, where n=1.5,2,3 and Xmax is 64. Each channel is employed to transmit a series of virtual container, for example, VC-4(SDH) or STS-3c (SONET) frames possibly along different physical paths resulting in different propagation delays across the link. In the example of FIG. 1, a group of channels 16 comprising containers VC-4 #1, #2, #3 & #4 is shown as following a long route whereas the group of channels comprising containers VC-4 #5, #6 & #7 is shown as following a short route.

Link Capacity Adjustment Scheme (LCAS), is an enhancement to Virtual Concatenation and has been accepted for inclusion in ANSI standard, T1.105 and approved in ITU-T SG15 recommendation G.7042. LCAS defines the protocol, which is used to change the bandwidth capacity of a Virtual Concatenated link. This is normally carried out in response to a request from a Network Management System (NMS) 30 which is in communication with both components 20,22 and which may have made provision for more channels or which needs to de-provision channels that may be in use. A change in bandwidth may also take place in response to an unplanned channel failure, as indicated by the numeral 24, on one or more in-use channels of a link.

Part of the LCAS methodology is a hand-shake signalling protocol between a source and a sink to achieve a hitless increase or decrease of the link bandwidth (or capacity). It works by switching in (or out) a parallel channel at a precise point in time when the sink has confirmed the channel status back to the source that it is ready to do so. This mechanism is also used when a channel fails (obviously causing a hit indicated by the numeral 24) and must be removed from the link.

Hand-shake information is contained in a VC-4 frame header. For the purposes of the present description, in the case of High Order LCAS, one byte of this header H4 is of relevance, H4 information is built up over 16 frames to provide control information for a multi-frame. FIG. 2 shows the semantics of the 4 most significant bits (MSB) of the H4 bytes for frames 0 to 15 of a LCAS high order multi-frame. In the case of Low Order LCAS, FIG. 11(a), the hand-shake information is contained in a 32-bit string of bit 2 of the K4 byte. This 32 bit string is built up over 32 four-frame multi-frames to provide LCAS control information.

Some of these blocks such as SQ, Ctrl, GID and CRC-8 are populated by a component acting as a source and relate to traffic it is providing to a sink on one link. Other blocks, such as MST, RS-Ack, MFI-2, are provided on a return link by the component acting as the sink for such traffic.

In particular, a sink provides channel status information on the return link by setting the respective bits of MST_MSB and MST_LSB indicated by the numeral 34 to provide the state of up to 8 channels in a multi-frame. MFI-2_MSB and MFI-2 LSB indicated by the numeral 32 give the frame count within a multi-frame and so identify which 8 of a total of 256/64 channel states are being provided in the multi-frame.

Thus, the status of all possible channels (256 HO; 64 LO) are reported back through a return channel in batches of eight within each multi-frame. The first multi-frame carries 0–7, the second 8–15, the third 16–23 etc. until all 256HO/64LO are reported and the process repeats. It should be noted that the same batch status is reported on all return channels, so for example if there are seven return channels, they all carry the same status information.

Each frame of a multi-frame takes 125 μs to transmit and so a multi-frame comprising 16 frames takes 2 ms to transmit. For high order LCAS, it takes 32 multi-frames to transmit the channel status of all 256 channels of a link. Thus, channel status confirmation from the sink can take up to 64 ms for high order LCAS. A low order multi-frame takes 16 ms to transmit and 8 multi-frames are required to transmit the status of all 64 channels. Thus, in the case of low order LCAS it takes 128 ms to return channel status information.

In the SONET/SDH non-protected scenario, if one or more of the diversely routed channels is 'hit', the remaining channels can continue to carry the data, albeit at a reduced bandwidth. However, the LCAS scheme cannot be guaranteed to recover before the sink response time of 64 ms/128 ms. This does not include the propagation delay of the link. Where this propagation delay is large by comparison to the response time, it means that many frames will be transmitted down a hit channel before the source recovers.

It is therefore desirable to improve the response time for adjusting the capacity of a link, particularly, in response to a failure.

DISCLOSURE OF THE INVENTION

According to the present invention, there is provided a method operable in a first component for adjusting the capacity of a network link as claimed in claim 1 and a component for adjusting the capacity of a network link according to claim 2.

BRIEF DESCRIPTION OF THE DRAWINGS

Various embodiments of the invention will now be described with reference to the accompanying drawings, in which:

FIG. 2 is a block diagram illustrating the semantics of the H4 block in a conventional high order LCAS multi-frame;

FIG. 8 illustrates MSTs being returned out of phase from one another according to one aspect of a preferred embodiment of the invention;

FIG. 9 illustrates the MSTs being returned for a fibre channel link over STS-3c-19v having 19 forward channels and 3 return channels for a preferred embodiment of the invention;

FIGS. 11(a) and 11(b) show a conventional low order LCAS Control Packet (32-bit string) and an LCAS Control Packet according to a preferred embodiment of the present invention respectively.

DESCRIPTION OF THE PREFERRED EMBODIMENTS

Figure 1:
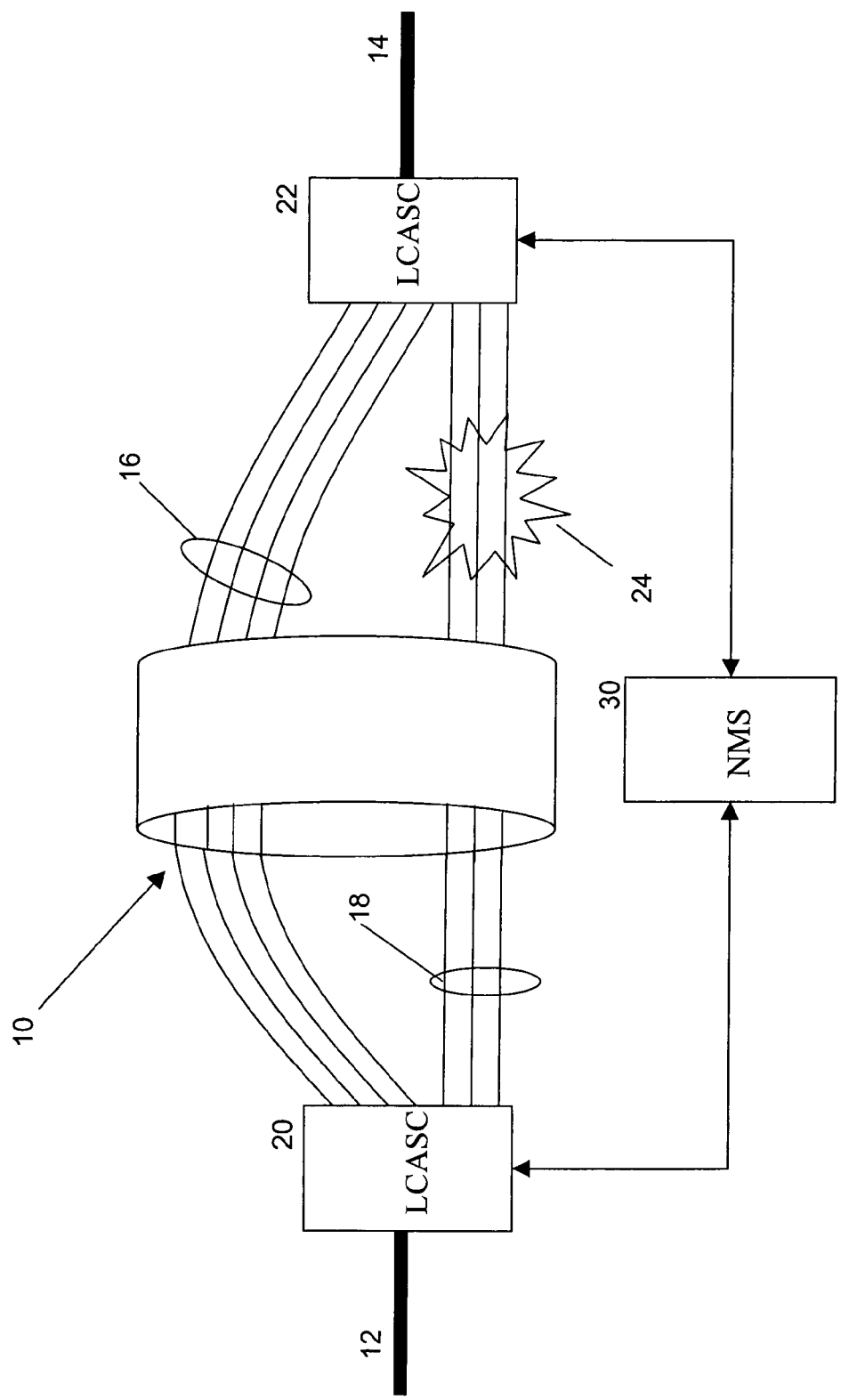
FIG. 1 is a schematic diagram of an LCAS link.
Figure 3:
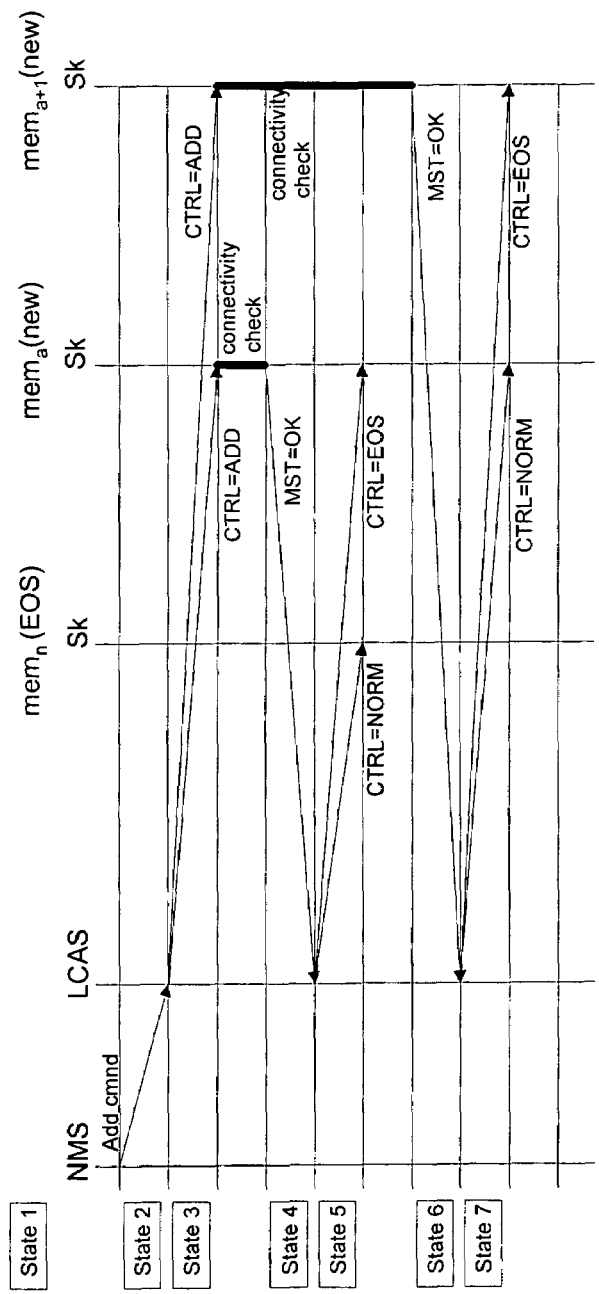
FIG. 3 shows the G.7042 protocol for the planned addition of multiple channels.

Referring now to FIGS. 1 and 3 and Table 1, the operation of an improved component according to the invention will first be described in terms of the conventional aspects of its operation. In order to increase bandwidth of a link, a component acting as a source (So), places an ADD command in the H4 block designated as containing a control character (CTRL). In the example of FIG. 3, Channel n is the last channel in a link and it is desired to add two further channels a and a+1.

In state 1, each source channel in the link is transmitting multi-frames and populating the CTRL and SQ H4 blocks accordingly. Similarly, each sink is populating the MST H4 blocks of return multi-frames. Channels 1 to n−1 include the command NORM for their CTRL character, whereas Channel n includes the command EOS (End of Sequence) in the CTRL character of its multi-frame. The unused channels a and a+1 include IDLE in their control character. On each provisioned channel of the return link, the multi-frames include member status (MST) bits for all channels. For channels 1 to n these indicate OK whereas the bits for the unused provisioned channels indicate FAIL. At state 2, possibly because the NMS 30 see that more channels are provisioned than are currently being used, the NMS may decide to use them. The NMS therefore transmits a command to a component acting as a source to add two provisioned channels to the link. At state 3, the source component causes the sources (So(a) and So(a+1)) for these channels to set their respective CTRL characters to ADD. The example shows the sink (Sk) for new channel (a) responding with MST=OK on the return link before the sink responds for new channel (a+1), state 4. This is arbitrary and the first channel to respond with MST=OK shall be allocated a sequence number SQ n, with the next new channel to respond with MST=OK being allocated sequence number n+1 etc. If for any reason a channel being added does not respond with MST=OK within the time-out period, then the source component reports a fail for that channel.

Nonetheless, it will also be seen from the transition from state 3 to state 4 above, that it can take at least a complete multi-frame for the sink to provide the member status required and as such the link capacity will not change within this time. In the case of the planned addition of a channel, this is not a great drawback as the protocol is still hitless. However, as will be seen later, it causes performance problems when unplanned capacity adjustment is required.

Nonetheless, at state 5 the total number of links n is incremented, channel a is designated to include EOS in its CTRL character and previous channel n is designated to include NORM in its CTRL character. The states 4 and 5 are then repeated for states 6 and 7 when channel a+1 is added as the nth channel and the sequence number is again incremented.

Figure 4:
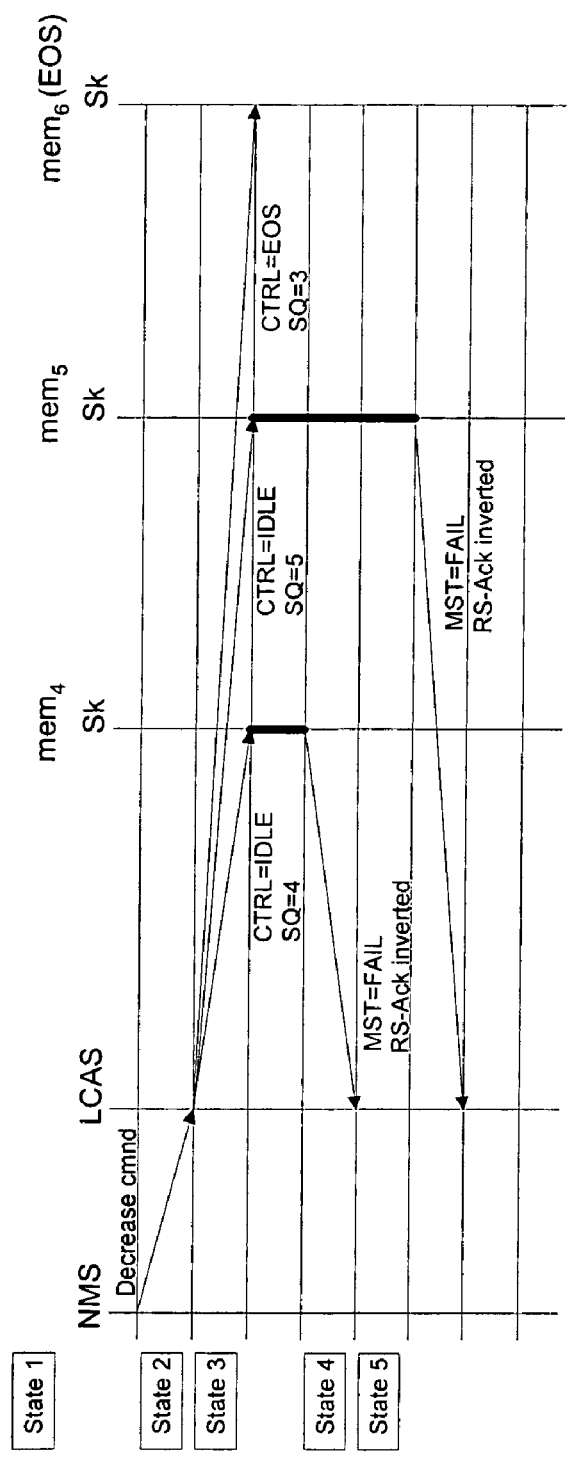
FIG. 4 shows the G.7042 protocol for the planned removal of multiple channels.

Referring now to FIG. 4 and Table 2 which shows the G.7042 protocol for the planned removal of channels 4 and 5 out of 6. The initial condition, state 1, is as per state 7 of Table 1.

TABLE 1

| State | | Channel n | | | Channel a (new) | | | Channel a + 1 (new) | | |
|---|---|---|---|---|---|---|---|---|---|---|
| | | CTRL | SQ | MST | CTRL | SQ | MST | CTRL | SQ | MST |
| 1 | Initial Condition | EOS | n − 1 | OK | IDLE | >n − 1 | FAIL | IDLE | >n − 1 | FAIL |
| 2 | NMS issues Add Cmnd to LCASC | EOS | n − 1 | OK | IDLE | >n − 1 | FAIL | IDLE | >n − 1 | FAIL |
| 3 | So (a) sends CTRL = ADD and SQ = n; So (a + 1) sends CTRL = ADD and SQ = n + 1 | EOS | n − 1 | OK | ADD | n | FAIL | ADD | n + 1 | FAIL |
| 4 | Sk (a) sends MS = OK to So | EOS | n − 1 | OK | ADD | n | OK | ADD | n + 1 | FAIL |
| 5 | So (n − 1) sends CTRL = NORM; So (a) sends CTRL = EOS and SQ = n | NORM | n − 1 | OK | EOS | n | OK | ADD | n + 1 | FAIL |
| 6 | Sk (a + 1) sends MST = OK to So | NORM | n − 1 | OK | EOS | n | OK | ADD | n + 1 | OK |
| 7 | So (a) sends CTRL = NORM; So (a + 1) sends CTRL = EOS | NORM | n − 1 | OK | NORM | N | OK | EOS | n + 1 | OK |

TABLE 2

| State | | Channel 4 | | | Channel 5 | | | Channel 6 | | |
|---|---|---|---|---|---|---|---|---|---|---|
| | | CTRL | SQ | MST | CTRL | SQ | MST | CTRL | SQ | MST |
| 1 | Initial Condition | NORM | 3 | OK | NORM | 4 | OK | EOS | 5 | OK |
| 2 | NMS issues Dec Cmnd to LCASC | NORM | 3 | OK | NORM | 4 | OK | EOS | 5 | OK |
| 3 | So (3) sends CTRL = IDLE, SQ = 4 So (4) sends CTRL = IDLE, SQ = 5 So (5) sends SQ = 3 | IDLE | 4 | OK | IDLE | 5 | OK | EOS | 3 | OK |
| 4 | Sk (un-wanted) sends MST = FAIL to So, and RS-Ack bit inverted | IDLE | 4 | FAIL | IDLE | 5 | OK | EOS | 3 | OK |
| 5 | Sk (un-wanted) sends MST = FAIL to So, and RS-Ack bit inverted | IDLE | 4 | FAIL | IDLE | 5 | FAIL | EOS | 3 | OK |

In state 2, the NMS may decide it wishes to de-provision some channels. The NMS thus sends a command requesting that that number of links be decremented in this case by two. In state 3, the source sets the CTRL character to IDLE on the channels to be removed. It should be noted that the CTRL character does not change for the other channels of the group. The example above shows two channels being removed with a simultaneous IDLE command from the source. Re-assembly of multi-frames at the sink ceases to use the 'removed' channels immediately upon receipt of the IDLE command.

The response however from the Sink may not be simultaneous. Nonetheless, this is of course simply an acknowledgement that the channel is no longer in use at the sink end and the NMS may proceed with de-provisioning of that channel if desired.

RS-Ack stands for Re-Sequence Acknowledge. Any changes detected at the sink regarding the member sequence numbers are reported to the source by toggling (i.e. change from '0' to '1' or from '1' to '0') the RS-Ack bit. Specifically, the RS-Ack bit can only be toggled after the status of all members of the link has been evaluated. The toggling of the RS-Ack bit validates the MST in the preceding multi-frame. The source can use this toggling as an indication that the change initiated by the source has been accepted, and will start accepting new MST information.

Figure 5:
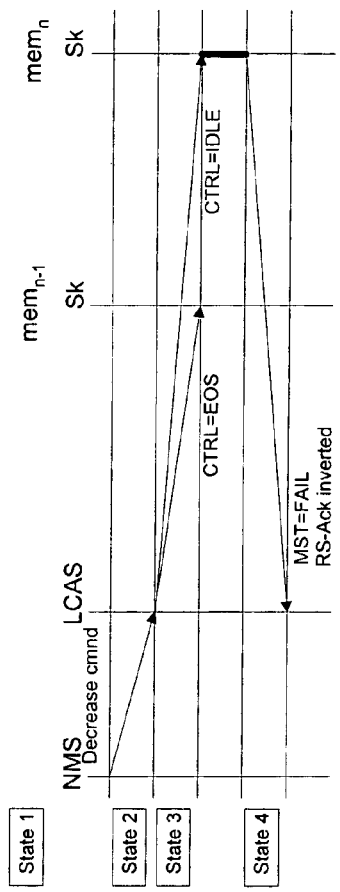
FIG. 5 shows the G.7042 protocol for the planned removal of a last channel in a link.

FIG. 5 and Table 3 show the G.7042 protocol for the planned decrease of a single (last) channel.

TABLE 3

| State | | Channel n − 1 | | | Channel n | | |
|---|---|---|---|---|---|---|---|
| | | CTRL | SQ | MST | CTRL | SQ | MST |
| 1 | Initial Condition | NORM | n − 2 | OK | EOS | n − 1 | OK |
| 2 | NMS issues Dec Cmnd to LCASC | NORM | n − 2 | OK | EOS | n − 1 | OK |
| 3 | So (un-wanted) sends CTRL = IDLE, SQ = n − 1, So (n − 2) sends CTRL = EOS | EOS | n − 2 | OK | IDLE | n = 1 | OK |
| 4 | Sk (un-wanted) sends MST = FAIL, and RS-Ack bit inverted to So | EOS | n − 2 | OK | IDLE | n − 1 | FAIL |

In this case, the source receives the command from the NMS at state 2 that the last channel is to be removed, possibly because it is to be de-provisioned. At state 3, the source changes the CTRL character for the last channel to IDLE and the CTRL character for the previous last channel to EOS. At state 4, the sink then begins to send MST FAIL for the channel, at which point the NMS can de-provision the channel.

In relation to the sequence number SQ allocated to a channel, in general, all un-wanted channels are allocated or re-allocated a sequence number greater than the sequence number of the channel sending the EOS CTRL character. All remaining required channels are allocated or re-allocated consecutive sequence numbers below the un-required channels designated (U) in the following example:

| | VC | A | B | C | D | E | F | G |
|---|---|---|---|---|---|---|---|---|
| Before | SQ | 0 | 1 | 2 | 3 | 4 | 5 | 6 |
| | | | | U | U | | | U |
| After | SQ | 0 | 1 | 4 | 5 | 2 | 3 | 6 |

Figure 6:
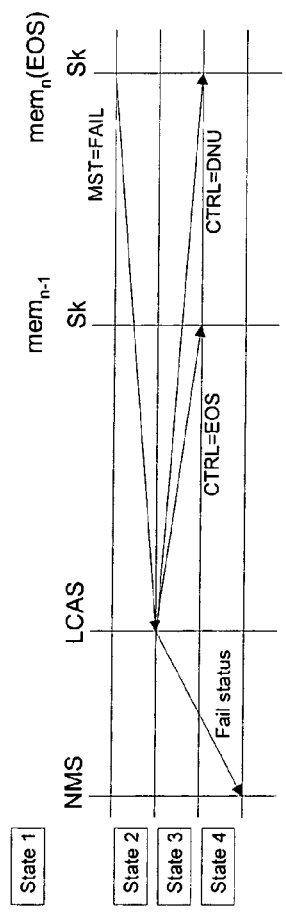
FIG. 6 shows the G.7042 protocol to decrease bandwidth due to a network fault in a single (last) channel.

Turning now to decreasing the bandwidth of a link due to a fault. In the example of FIG. 6 and Table 4 the last channel n in a link fails.

TABLE 4

| State | | Channel n − 1 | | | Channel n (EOS) | | |
|---|---|---|---|---|---|---|---|
| | | CTRL | SQ | MST | CTRL | SQ | MST |
| 1 | Initial Condition | NORM | n − 2 | OK | EOS | n − 1 | OK |
| 2 | Sk (fault_mem) sends MST = FAIL to So | NORM | n − 2 | OK | EOS | n − 1 | FAIL |
| 3 | So (fault_mem) sends DNU; So (fault_mem − 1) sends EOS | EOS | n − 2 | OK | DNU | n − 1 | FAIL |
| 4 | LCASC sends Fail status to NMS | EOS | n − 2 | OK | DNU | n − 1 | FAIL |

Again the initial conditions of state 1 are as before. When the sink detects a fault for the channel, it begins to assemble the next appropriate multi-frame (or possibly its current multi-frame) to indicate a fail in the MST bit for the channel. As explained in the introduction, it may take up to 32 multi-frames for high order LCAS or 8 multi-frames for low order LCAS, plus the link propagation delay, before the source receives the MST bit indicating the failure of the channel, state 2. As will be seen from the explanation of sequence numbering above, where the failing channel is the last channel, the sequence numbering need not be changed, however, the CTRL character for channel with the highest remaining sequence number must be changed to EOS. The source also sets the CTRL character to DNU (Do Not Use) on the faulty channel. The source also indicates the failure to the NMS so flagging that the channel should be repaired or de-provisioned or alternatively that another channel should be added to the link.

Figure 7:
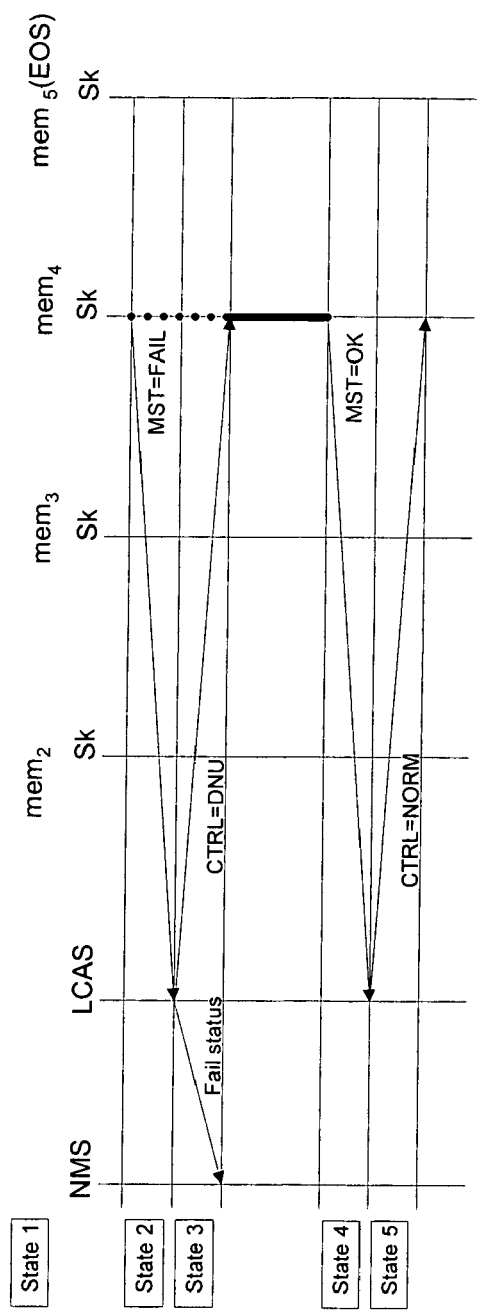
FIG. 7 shows the G.7042 protocol to decrease bandwidth due to network fault in a single (not last) channel.

FIG. 7 and Table 5 show the G.7042 protocol to decrease bandwidth due to network fault in a channel other than the last channel.

In the majority of known applications there are considerably less than 256/64 forward channels, however, even in the absolute worst-case scenario, where all forward channels are used, the response time is no worse than in the prior art that is 64 ms/128 ms.

It will be seen from the description above that there may be a difference between the number of channels provisioned and those being used in a link (the latter being smaller than

TABLE 5

| | | Channel 2 | | | Channel 3 | | | Channel 4 | | | Channel 5 (EOS) | | |
|---|---|---|---|---|---|---|---|---|---|---|---|---|---|
| State | | CTRL | SQ | MST | CTRL | SQ | MST | CTRL | SQ | MST | CTRL | SQ | MST |
| 1 | Initial Condition | NORM | 1 | OK | NORM | 2 | OK | NORM | 3 | OK | EOS | 4 | OK |
| 2 | Sk (fault mem) send MST = FAIL to So | NORM | 1 | OK | NORM | 2 | OK | NORM | 3 | FAIL | EOS | 4 | OK |
| 3 | So (fault mem) send CTRL = DNU | NORM | 1 | OK | NORM | 2 | OK | DNU | 3 | FAIL | EOS | 4 | OK |
| 4 | Network Fault cleared MST = OK sent to So | NORM | 1 | OK | NORM | 2 | OK | DNU | 3 | OK | EOS | 4 | OK |
| 5 | CTRL changed from DNU to NORM | NORM | 1 | OK | NORM | 2 | OK | NORM | 3 | OK | EOS | 4 | OK |

At state 2, the sink indicates on the return link that channel 4 has failed. As before in state 3, once the source detects the failure, the CTRL character for this channel is set to DNU.

It should be noted that as soon as the fail is detected, state 3, the sink immediately begins re-assembly of the concatenated group using only the NORM and EOS channels. For a time amounting to the propagation time from the sink to the source plus the re-action time of the source plus the propagation time from source to sink, the re assembled data will be erroneous because it is sent on all channels as before the fault.

However, at state 3, the source stops sending data on the erroneous channels (since they will have been reported back as MS=Fail and consequently the failed channel is set to DNU), and sends data only on the remaining NORM and EOS channels. The component at the receiving end does not know when the data integrity has been re-established and this is dealt with at the data layer.

It will be seen that no re-sequencing is carried out by the source in response to a channel failure. The source simply ignores the failed channel and divides the incoming client signal between the remaining channels. At the same time, the sink knows not to expect data on the failed channel. If the capacity of the link is to be restored without repairing the channel, then the NMS 30 needs to instruct the source to add provisioned channels to the link as described above.

When the failed channel is repaired, state 4, the CTRL character is changed to NORM from DNU, state 5. The sink will then use this channel again to re-assemble the data.

In a preferred embodiment of the present invention, the problems of the LCAS protocol outlined above in responding to a failure in a channel or indeed in readily adjusting the capacity of a channel are addressed with a combination of two techniques.

In general, the first technique involves a sink providing only the number of member status MSTs needed for a forward link on the return channel. Since these are returned in batches of eight then the number of MST bits sent back by the sink will be the next highest multiple eight. Consequently the time taken to cycle around all the channels by the sink will be reduced and so too the response time of the system to a failure. For example, 19 forward channels can be represented by only 3 multi-frames, each indicating the status of up to 8 channels. So in this example considering worst case, it would takes 6 ms for high order LCAS or 48 ms for low order LCAS to indicate a failure.

the former). In the preferred embodiment of the invention, the sink returns member status information for all provisioned channels. Referring back to FIG. 3 and Table 5, this is because a source needs to know the status of a channel before it is added to a link. If the sink were only returning the status of used members in a link, then the source might otherwise never receive the required member status to add the channel to the link. Both source and sink components are advised by the NMS about the number of provisioned channels and so this technique requires the least change to the existing protocol.

Nonetheless, it will be seen that in some applications the benefit of the invention may be lost by providing member status for many provisioned channels when fewer channels are consistently being used. It may therefore be desirable to implement the invention in an alternative manner by having the sink in general return the status of only in-use channels. This may require some minor changes to the protocol in terms of the sink increasing the number of member status values being returned when requested by the source to add channels to a link. This could be implemented, for example, by the source switching off the MST-Offset indicator bit before it tries to add channels. The sink sees this and then begins to return MST information for all possible members in the conventional manner. Then once the channel(s) have been added, the source can turn back on the MST-Offset indicator bit, to cause the sink to start returning member state information as described for the preferred embodiments.

The second technique employed within the invention involves the component acting as a sink sending back the member status of different channels on the different return channels. Ideally the distribution of the member status of the different channels should be such that the time between occurrences of the same member status on different return channels is minimised. For example where there are two return channels, the sink reports member status on the return channels 180° out of phase from one another; if there are three return channels the sink reports member status on the return channels 120° out of phase; if there are four return channels the sink reports member status on the return channels 90° out of phase etc. until if there are 32 return channels the sink reports member status on the return channels 11.25° out of phase. This enables response time to be halved each time the number of return channels is doubled.

By way of example, FIG. 8 shows the member status bits being reported on two return channels 180° out of phase from one another rather than using the present protocol where return channels report same batch of MSTs in any given set of simultaneously transmitted return frames.

It will be seen that there is no gain beyond 32 return channels as for both high and low order LCAS, this provides the status of the maximum number of forward channels in a single set of simultaneously transmitted return frames.

In the preferred embodiment of the invention, these first and second techniques are combined so that the component acting as a sink sends back status bits for only the number of forward channels in a phased manner—this drastically reduces the response time for all known applications.

Take, for example, FIG. 9 which illustrates the MST being returned for a fibre channel link over Synchronous Transport Signal STS-3c-19v having 19 forward channels and 3 return channels. Using the first technique alone where only the limited number of MSTs are returned, the response time is up to 6 ms. With the second phased technique alone, the response time is up to 32 ms/16 ms for high or low order LCAS respectively. With the combination of techniques, however, the response time is 2 ms, i.e. the time for one multi-frame.

It is acknowledged that the first technique provides a limited improvement where the number of forward channels is large. Similarly, the second technique provides a limited improvement where the number of return channels is small. However, the combination of both techniques provides an even better improvement.

In relation to the more specific implementation of the invention, it will been seen that it is desirable for a component arranged to act as a sink for the present invention to be compatible with a conventional component acting as a source which of course expects MST bits to be returned in-phase for all channels over a series of multi-frames. Thus, to ensure backward compatibility, each component preferably sends a signal to the other to indicate whether or not it supports the invention. The signal can be implemented, for example, as a new type of command used once in the CTRL character of a multi-frame, or the signal can be "permanently" included in one of the currently reserved H4 blocks RES within a multi-frame, FIG. 2.

If a source sees this signal, then it can treat MST bits being returned from a sink as being phased and limited according to the invention. Similarly, if a sink sees the corresponding signal, then it can phase and limit the MST bits that it returns.

It will be seen, however, that in the current G.7402 protocol, the channels to which the values of the MST bits are applied are derived from the MFI-2 blocks. To vary the channels to which the MST values are applied means the MF count should be varied; but this value is also needed for re-alignment of frame content being transmitted.

Figure 10:
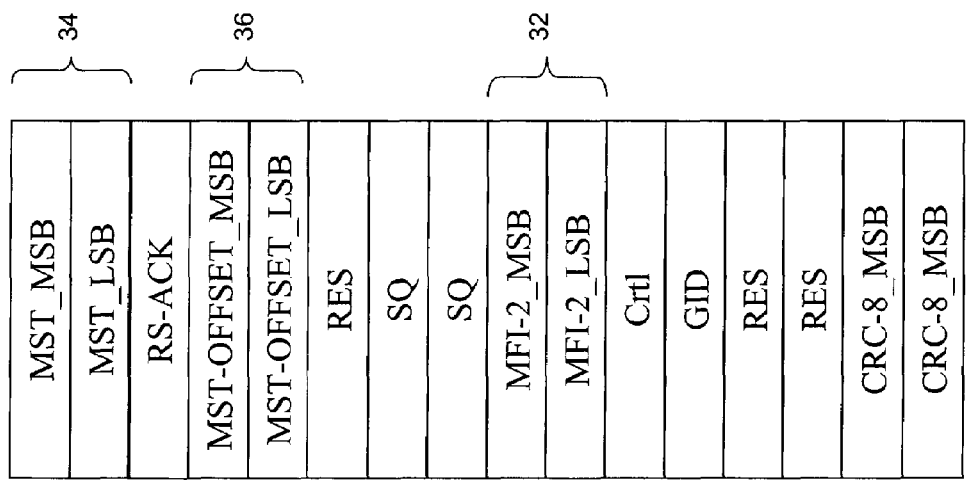
FIG. 10 is a block diagram illustrating the semantics of the H4 block in a high order LCAS multi-frame according to a preferred embodiment of the invention.

FIG. 10 is a block diagram illustrating the semantics of the H4 block in a High Order LCAS multi-frame according to a preferred embodiment of the invention. In this case, the semantics of the MFI-2 block remain the same. However, two previously reserved H4 blocks 36 are now designated MST-Offset. One bit in the MSB of MST-offset is used as the signal to indicate that a component is compliant with the present invention. The remaining bits of MST-Offset indicate the number to be added to the MFI-2 value for interpretation of the channels to which the MST byte sent back should be applied.

As indicated above, the sink can provide member status information for all provisioned channels. Alternatively, to determine the maximum number of in-use channels for which MST bits are to be returned, the sink uses the SQ value from the channel with a CTRL character set to EOS. This is then divided by eight and rounded up to determine the number of multi-frames over which the MSTs bits are to be transmitted. The sink then phases these MSTs across the return channels with the MST-Offset values being set for each return channel. The source can then take the MST, MST-Offset and MFI-2 values for each return channel to gain member status information in an improved manner. Of course, the protocol then needs to be suitably amended to indicate to the sink when it should start returning member status information for more than only the in-use channels.

In the case of Low Order LCAS, the 32-bit string of bit 2 of the K4 byte is used for the LCAS protocol as shown in FIG. 11($a$). Here it will be seen that there are currently only four bits spare. To implement the preferred embodiment of the invention, FIG. 11($b$), one of these bits 38 is used to signal that either a source or sinking component complies with the invention. The remaining three free bits are used by a sink in the same manner as the MST-Offset block of the High Order embodiment.

It will be seen that while the invention has been described in terms of a networked component, the invention is equally implementable as a computer program product which when executed on a networked device is operable to adjust the capacity of a network link as well as in a signal encoded by a networked device according to the present invention.

The invention claimed is:

1. A method operable in a first component for adjusting the capacity of a network link between said first component and another component, said method comprising:
   receiving a first data signal;
   transmitting to said another component across forward channels of said network link a plurality of second data signals carrying the data of said first data signal and control information for a plurality of third data signals;
   receiving from said another component said plurality of third data signals across respective return channels, said third data signals carrying control information for said plurality of second data signals which includes status information for less than a maximum number of said forward channels, said status information being out of phase within each of said return channels in respect of the forward channels to which the status information relates; and
   adjusting the capacity of said network link in response to said status information.

2. A component for adjusting the capacity of a network link between said component and another component, said component comprising:
   a receiver for receiving a first data signal;
   a transmitter for transmitting across forward channels of said network link a plurality of second data signals carrying the data of said first data signal and control information for a plurality of third data signals;
   a receiver for receiving said plurality of third data signals across respective return channels, said third data signals carrying control information for said plurality of second data signals which includes status information for less than a maximum number of said forward channels, said status information being out of phase within each of said return channels in respect of the forward channels to which the status information relates; wherein
   the component is responsive to said status information to adjust the capacity of said network link.

3. A component according to claim 2 wherein said component is arranged to communicate with said another component across a plurality of provisioned channels, said provisioned channels comprising a number of channels equal to or less than said maximum number of channels and wherein said forward channels comprise a number of in-use channels equal to or less than said number of provisioned channels.

4. A component according to claim 3 wherein said component is arranged to receive in said control information status information for said number of provisioned channels.

5. A component according to claim 3 wherein said component is arranged to receive in said control information status information for said number of in-use channels.

6. A component according to claim 5 wherein said component is arranged to selectively request said another component to provide in control information for said second data signals status information for said number of provisioned channels.

7. A component according to claim 2 wherein said component encapsulates the first data signals within the second data signals using virtual concatenation.

8. A component according to claim 2 wherein said component is arranged to adjust the capacity of said network link according to a link capacity adjustment scheme (LCAS).

9. A component according to claim 2 wherein said component is arranged to adjust the capacity of said network link by adding one or more forward channels to said network link whose status information indicates said forward channels are functioning.

10. A component according to claim 2 wherein said component is arranged to adjust the capacity of said network link by removing one or more forward channels from said network link whose status information indicates said forward channels are malfunctioning.

11. A component according to claim 2 wherein said component is arranged to include in said forward channel control information an indicator that the component is arranged to receive status information for less than the maximum number of forward channels in said network link, said status information being out phase within each of said return channels.

12. A component according to claim 2 wherein said component is arranged to receive in said return channel control information an indicator that said status information is for less than the maximum number of forward channels in said network link and that said status information is out phase within each of said return channels.

13. A component according to claim 12 wherein said component is further arranged to receive in said control channel information for each return channel a respective offset indicating the forward channels to which said status information relates.

14. A component according to claim 2 wherein said component is arranged to transmit in said control information of said second data signals, status information for less than the maximum number of return channels in said second network link, said status information being out phase within each of said forward channels in respect of the return channels to which the status information relates.

15. A component according to claim 2 arranged to communicate with a network management system, said network management system being arranged to provision said forward and return channels between said component and said another component, said component being response to instructions from said network management system to add or remove forward channels from said network link.

16. A component according to claim 15 wherein said component is arranged to communicate said status information to said network management system.

17. A component according to claim 1 wherein there are two return channels and wherein said status information for said forward channels is 180° out of phase.

18. A computer program product which when executed on a networked device is operable to adjust the capacity of a network link, said computer program product comprising instructions effective to cause the networked device to:
  receive a first data signal;
  transmit to said another component across forward channels of said network link a plurality of second data signals carrying the data of said first data signal and control information for a plurality of third data signals;
  receive from said another component said plurality of third data signals across respective return channels, said third data signals carrying control information for said plurality of second data signals which includes status information for less than a maximum number of said forward channels, said status information being out phase within each of said return channels in respect of the forward channels to which the status information relates; and
  adjust the capacity of said network link in response to said status information.

19. A system comprising a component according to claim 2 in communication across said network link and said second network link with another component according to claim 2.

* * * * *